(12) United States Patent
Tsuruta et al.

(10) Patent No.: US 9,692,038 B2
(45) Date of Patent: Jun. 27, 2017

(54) CAP FOR ELECTROCHEMICAL CELL

(71) Applicant: Tesla Motors, Inc., Palo Alto, CA (US)

(72) Inventors: Kunio Tsuruta, Cupertino, CA (US); Kenjin Masumoto, Nishinomiya (JP)

(73) Assignee: TESLA, INC., Palo Alto, CA (US)

( * ) Notice: Subject to any disclaimer, the term of this patent is extended or adjusted under 35 U.S.C. 154(b) by 93 days.

(21) Appl. No.: 14/552,323

(22) Filed: Nov. 24, 2014

(65) Prior Publication Data
US 2015/0147600 A1 May 28, 2015

Related U.S. Application Data

(60) Provisional application No. 61/908,627, filed on Nov. 25, 2013, provisional application No. 61/978,351, filed on Apr. 11, 2014, provisional application No. 61/978,367, filed on Apr. 11, 2014.

(51) Int. Cl.
*H01M 2/34* (2006.01)
*H01M 2/04* (2006.01)
*H01M 2/12* (2006.01)
*H01M 2/02* (2006.01)

(52) U.S. Cl.
CPC ......... *H01M 2/345* (2013.01); *H01M 2/0413* (2013.01); *H01M 2/1241* (2013.01); *H01M 2/022* (2013.01); *H01M 2200/20* (2013.01)

(58) Field of Classification Search
CPC . H01M 2200/20; H01M 2/1241; H01M 2/345
See application file for complete search history.

(56) References Cited

U.S. PATENT DOCUMENTS

| 4,053,687 | A |   | 10/1977 | Coibion et al. |   |
|---|---|---|---|---|---|
| 5,567,539 | A | * | 10/1996 | Takahashi | H01H 37/323 429/57 |
| 5,609,972 | A | * | 3/1997 | Kaschmitter | H01M 2/1241 429/56 |
| 5,766,790 | A | * | 6/1998 | Kameishi | H01H 37/54 220/203.01 |
| 6,242,126 | B1 | * | 6/2001 | Mori | H01M 2/1235 429/53 |
| 6,258,477 | B1 | * | 7/2001 | Kashihara | H01M 2/1241 429/53 |
| 6,284,403 | B1 | * | 9/2001 | Tsurutani | H01M 2/1241 429/116 |
| 6,296,965 | B1 | * | 10/2001 | Azema | H01M 2/34 429/57 |
| 6,342,826 | B1 | * | 1/2002 | Quinn | H01H 35/343 337/13 |
| 6,346,344 | B1 | * | 2/2002 | Song | H01M 2/0456 429/53 |
| 6,376,120 | B1 | * | 4/2002 | Azema | H01M 2/345 429/57 |

(Continued)

*Primary Examiner* — Carlos Barcena
(74) *Attorney, Agent, or Firm* — Garlick & Markison; Bruce E. Garlick

(57) ABSTRACT

An electrochemical cell includes: a cell can; electrolyte and an active-material roll in the cell can; and a cap that closes at least one opening of the cell can, the cap comprising: a substantially flat member that covers the opening, the substantially flat member having a separation portion defined therein; and a diaphragm that covers the separation portion on an inside of the substantially flat member.

24 Claims, 9 Drawing Sheets

(56) References Cited

U.S. PATENT DOCUMENTS

| | | | | |
|---|---|---|---|---|
| 6,403,250 B1* | 6/2002 | Azema | ............... | H01M 2/1229 |
| | | | | 200/512 |
| 6,524,739 B1* | 2/2003 | Iwaizono | ............... | H01M 2/34 |
| | | | | 429/185 |
| 6,555,263 B1* | 4/2003 | Kim | ............... | H01M 2/1241 |
| | | | | 429/53 |
| 6,620,544 B1* | 9/2003 | Shin | ............... | H01M 2/0413 |
| | | | | 429/53 |
| 7,927,739 B2 | 4/2011 | Issaev et al. | | |
| 8,088,511 B2 | 1/2012 | Hermann et al. | | |
| 2003/0131880 A1* | 7/2003 | Marubayashi | ...... | H01M 2/1241 |
| | | | | 137/68.27 |
| 2004/0241536 A1* | 12/2004 | Kim | ............... | H01M 2/1241 |
| | | | | 429/65 |
| 2005/0214641 A1* | 9/2005 | Kim | ............... | H01M 2/0413 |
| | | | | 429/175 |
| 2010/0086835 A1* | 4/2010 | Kim | ............... | H01M 2/1241 |
| | | | | 429/56 |
| 2010/0136409 A1 | 6/2010 | Straubel et al. | | |
| 2010/0215997 A1 | 8/2010 | Byun et al. | | |
| 2010/0316894 A1* | 12/2010 | Hermann | ............ | H01M 2/1241 |
| | | | | 429/56 |
| 2011/0183163 A1* | 7/2011 | Suzuki | ............... | H01M 2/1241 |
| | | | | 429/56 |
| 2013/0059181 A1 | 3/2013 | LePort et al. | | |
| 2014/0127541 A1* | 5/2014 | Kubota | ............... | H01M 2/0413 |
| | | | | 429/61 |
| 2014/0377599 A1* | 12/2014 | Shimizu | ............... | H01M 2/02 |
| | | | | 429/53 |
| 2015/0079432 A1* | 3/2015 | Okuda | ............... | H01M 2/345 |
| | | | | 429/61 |

* cited by examiner

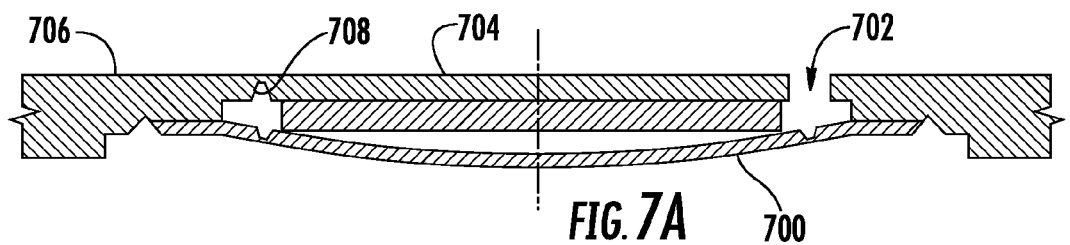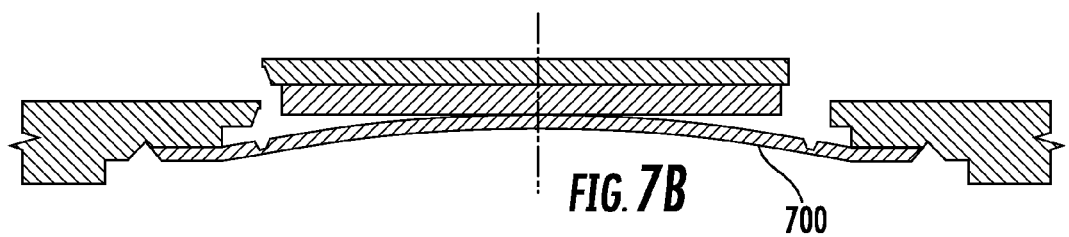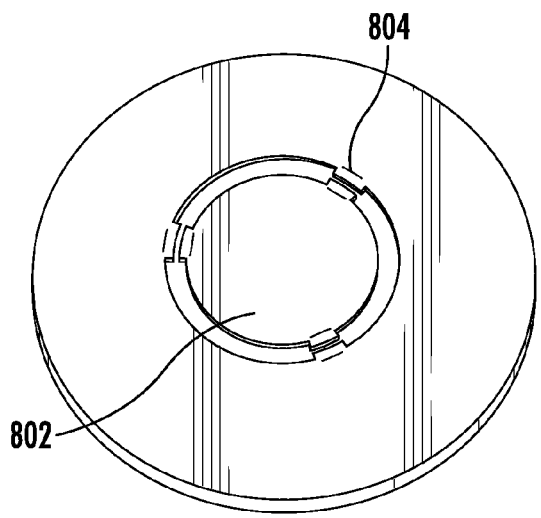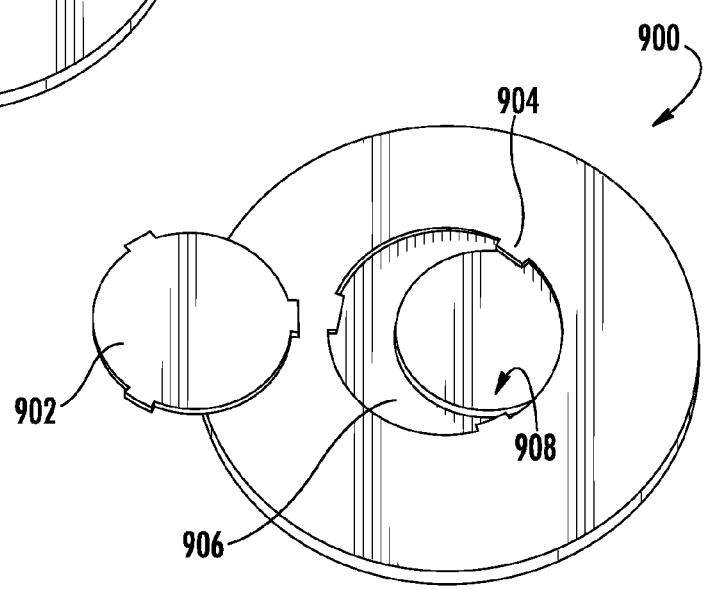

CAP FOR ELECTROCHEMICAL CELL

CROSS-REFERENCE TO RELATED APPLICATION

This application claims the benefit of the filing date of: U.S. provisional application 61/908,627, filed Nov. 25, 2013 and entitled "Cell Cap"; U.S. provisional application 61/978,351, filed Apr. 11, 2014 and entitled "Cell Cap"; and U.S. provisional application 61/978,367, filed Apr. 11, 2014 and entitled "Cell Cap"; the entire contents of each of which are incorporated herein by reference.

BACKGROUND

A cell cap is located at one end of a cell for storing electric energy, such as a lithium-ion cell. The cell cap provides a cathode terminal that can have an electrical connector attached to it on the outside of the cell. Some cells are provided with a current interruption device (CID) intended to interrupt the current if the internal pressure increases. Many existing cell caps are made from relatively many components, and/or may require complex machinery in the cell manufacturing process.

SUMMARY

This document describes examples of cell caps that have one or more advantages over existing designs.

In a first aspect, an electrochemical cell includes: a cell can; electrolyte and an active-material roll in the cell can; and a cap that closes at least one opening of the cell can, the cap comprising: a substantially flat member that covers the opening, the substantially flat member having a separation portion defined therein; and a diaphragm that covers the separation portion on an inside of the substantially flat member.

Implementations can include any or all of the following features. An electrical connector is attached to the separation portion on an outside of the cap. The electrochemical cell further includes a spacer positioned between the diaphragm and the substantially flat member. The separation portion is defined by a material weakening that surrounds the separation portion. The material weakening comprises a stamp formed in a material of the substantially flat member. The material weakening forms at least a first part of a circle around the separation portion. The separation portion is further defined by an opening through the substantially flat member, the diaphragm preventing leakage of the electrolyte through the opening. The opening forms at least a second part of the circle. The material weakening further comprises a radial stamp formed in a material of the substantially flat member. The electrochemical cell further includes a weld joint between the diaphragm and the substantially flat member. The diaphragm comprises a laminate of different materials. The diaphragm has a concave side facing the substantially flat member so that the diaphragm inverts upon presence of at least an inversion pressure, and the diaphragm and the substantially flat member are configured so that the inversion pressure is larger than a rupture pressure of the separation portion. The substantially flat member comprises a single piece. The electrochemical cell further includes a crimp between the cell can and the cap. The electrochemical cell further includes an inner member that forms the diaphragm, the inner member being wider than the substantially flat member, wherein the inner member forms the crimp around at least an edge of the substantially flat member. The diaphragm is thinner than a portion of the inner member that forms the crimp. The separation portion and a remainder of the substantially flat member are formed from different materials. The substantially flat member comprises a support structure having an opening through it, and a top plate covering the opening. The support structure and the top plate are formed from different materials. The electrochemical cell further includes a spacer positioned in the opening and between the top plate and the diaphragm. The electrochemical cell further includes an inner member that forms the diaphragm, the inner member being wider than the support structure, wherein the inner member forms a crimp around at least an edge of the support structure. The top plate is as wide as the support structure and wherein the inner member forms the crimp around both the edge of the support structure and an edge of the top plate.

In a second aspect, a method includes: providing a flow of electric current through a cap that closes at least one opening of an electrochemical cell, the electrochemical cell comprising a cell can with electrolyte and an active-material roll inside, wherein the cap comprises a substantially flat member that covers the opening, the substantially flat member having a separation portion defined therein, the electric current flowing through a connector attached to the separation portion; upon occurrence of a first pressure inside the electrochemical cell, interrupting the flow of the electric current by way of the separation portion being severed from a remainder of the substantially flat member, wherein a diaphragm on an inside of the substantially flat member prevents leakage out of the electrochemical cell; and upon occurrence of a second pressure inside the electrochemical cell after interruption of the flow of the electric current, venting the electrochemical cell by way of the diaphragm being ruptured so that fluid escapes through an opening left by the separation portion.

Implementations can provide any or all of the following advantages. A cell cap can be made from relatively fewer parts, which can provide a simpler, faster and/or less costly manufacturing process. Another example is that a leakage tendency can be reduced by eliminating one or more leak paths in the cell structure. As another example, a cell cap can be made that has less height than conventional ones, which can allow room for a relatively larger jelly roll of anode and cathode material inside the cell housing. As another example, a cell cap can be made that has an improved CID functionality.

BRIEF DESCRIPTION OF DRAWINGS

FIGS. 7A-B show an example of inversion of a diaphragm.
FIGS. 8 and 9 show examples of a cap during or after operation.

DETAILED DESCRIPTION

This document describes examples of structures that may be used, and operations that may be performed, with electrochemical cells. For example, and without limitation, such cells may use lithium-ion technology that allows repeated charging and discharging the cell with various amounts of energy. A cell may have any suitable form factor, for example cylindrical. A cell generally has a cell can that is sealed using a cap (sometimes referred to as a top cap), and inside the cell can is stored electrolyte and a roll of active material.

Figure 1A:
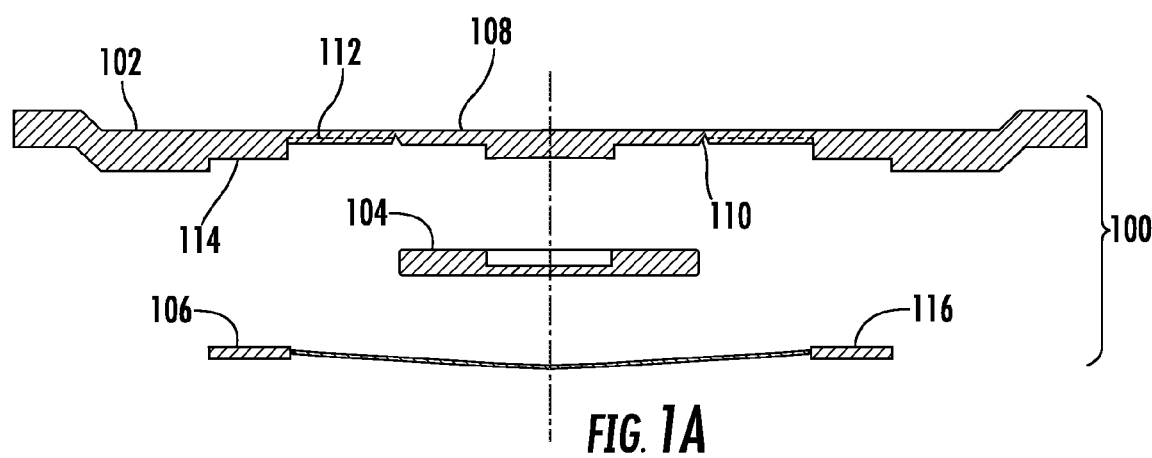
FIGS. 1A-B show an example of a cap for a cell.
Figure 1B:
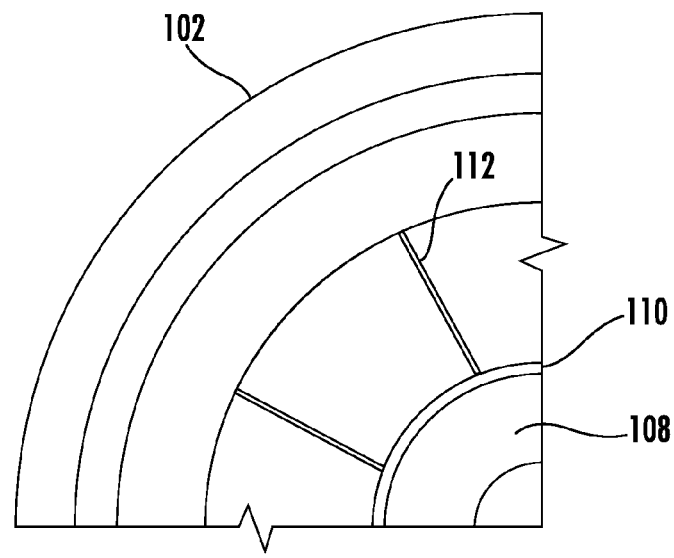

FIGS. 1A-B show an example of a cap 100 for a cell. The cap may be used for closing at least one opening of a cell can, for example an upper opening wherein the bottom of the can has no opening. In this example, the cap includes a member 102, a spacer 104 and a diaphragm 106. FIG. 1A shows an exploded view of components, and FIG. 1B shows a bottom view of the assembled cap.

In some implementations, the member 102 is a substantially flat member. For example, the member may have relatively thicker portions at the edge, where the cap is to be attached to the cell can, and may have one or more relatively thinner portions inward of the edge. The member can be made as a single piece of any suitable material, including, but not limited to, aluminum.

The member 102 here has a separation portion 108 defined therein. In some implementations, the separation portion is defined by a material weakening that surrounds the separation portion. For example, a groove 110 may be formed in the material of the member. Here, the groove surrounds the separation portion. As another example, one or more radial grooves 112 may be formed in the member. Two or more grooves can have the same or different residual thickness. In some implementations, a radial groove can connect to another groove, for example one that forms all or part of a circle.

In other implementations, the separation portion is formed as a piece separate from the rest of the member 102, and is then attached thereto using any suitable technique, including, but not limited to, welding.

The spacer 104 is configured to be positioned between the diaphragm 106 and the member 108. In some implementations, the spacer can cover substantially the entire surface of the separation portion 108. For example, one of the spacer and the separation portion may have a shape (e.g., a recess) that complements one or more features (e.g., a protrusion) on the other of the two, so as to provide correct positioning. The spacer can be made of any suitable material, including, but not limited to, a plastic material.

The diaphragm 106 is configured to be attached on an inside of the member 102. In some implementations, the member has a notch 114 for receiving the member. For example, a circumferential edge 116 of the diaphragm may be thicker than a remainder thereof, and may be attached at the notch using any suitable technique, including, but not limited to, by welding (i.e., a weld joint can be formed between the diaphragm and the member).

Figure 2A:
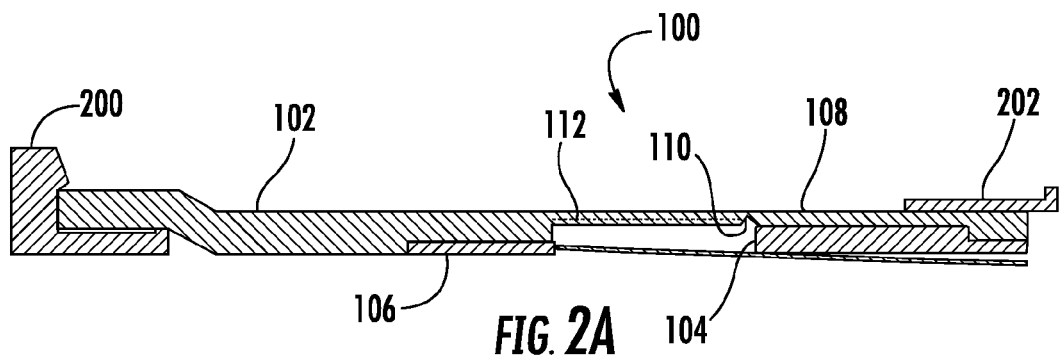
FIGS. 2A-C show examples of normal operation, CID operation, and venting operation, respectively, of the cap in FIGS. 1A-B.
Figure 2B:
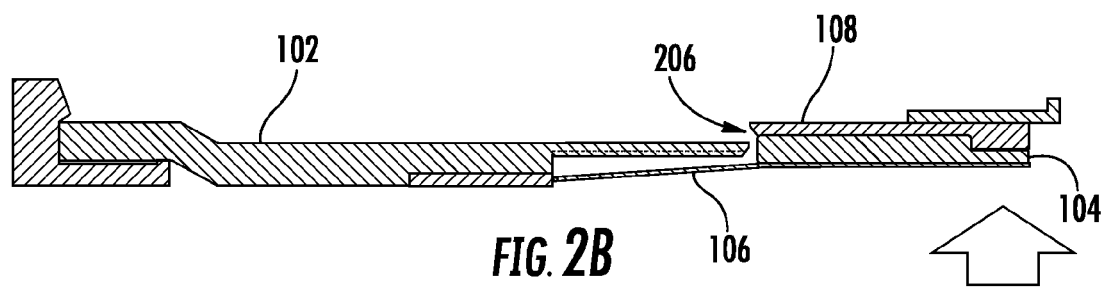
Figure 2C:
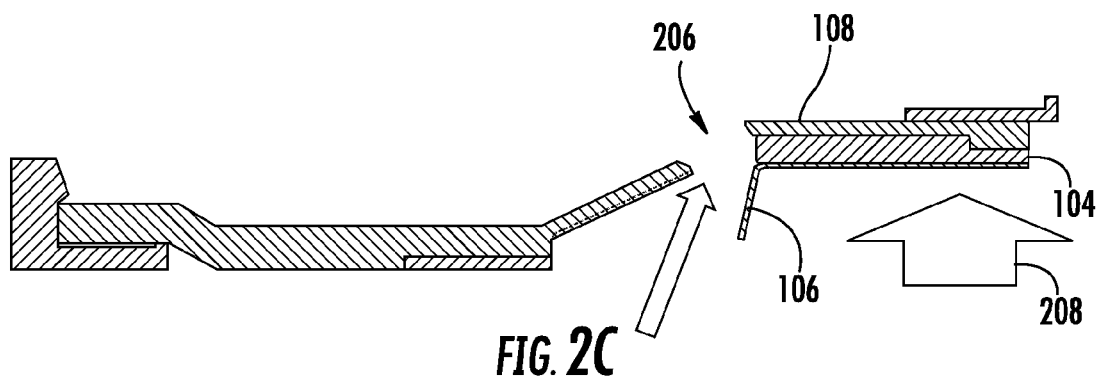

FIGS. 2A-C show examples of normal operation, CID operation, and venting operation, respectively, of the cap 100 in FIGS. 1A-B. For simplicity, these illustrations show approximately one half of the cap structure, with the other half being similar. The cap is here shown attached to a gasket 200, which may in turn be attached to a portion of the cell can, such as a top opening thereof. The cell can and contents thereof (e.g., electrolyte and active material) are not shown.

An electrical connector 202 is attached to the separation portion 108. The electrical connector serves as one of multiple leads for electrical current to flow into and out of the cell. For example, the cap can serve as a cathode terminal of the cell. In the assembled configuration, the spacer 104 is contained between the member 102 and the diaphragm 106, for example such that it is in contact with both of them.

During normal operation, current may or may not flow between the cell and the electrical connector 202. For example, at a first time the cell may be charged, at a second time the cell may remain inactive while at some particular state of charge without being charged or discharged, and at a third time the cell may be actively discharged, such as to directly or indirectly drive one or more loads (e.g., a motor). When current is flowing, at least part thereof generally passes through the cap. More particularly, the current may pass through the separation portion 108 because that is where the electrical connector is attached. During some or all of these stages (e.g., charging, inactive or discharging), the cell may be thermally managed, such as by a cooling system (not shown).

During normal operation (e.g., FIG. 2A) the separation portion remains attached to the rest of the member 102. For example, the groove(s) 110 and the radial groove(s) 112 are intact. Also, the central portion of the diaphragm currently has a concave side facing the member 102, and correspondingly a convex side facing into the cell can. The normal operation is characterized in that excessive temperatures are not occurring within the cell and there is no undue increase in the internal pressure of the cell.

In certain situations, however, the internal pressure may increase to a point where cell safety is compromised. Under such circumstances, it is desirable to interrupt the current flowing into or out of the cell, in an attempt to mitigate the situation. Here, this occurrence is generally referred to as CID operation.

FIG. 2B schematically illustrates, using an arrow 204, that the internal pressure of the cell has risen or is rising. This increase could be due to any of multiple reactions or occurrences in the cell. For example, gas could be developing due to a chemical reaction among the electrolyte and active material(s). The increased pressure here acts on the inward surface of the diaphragm 106, and thereby through the spacer 104 onto the inside of the separation portion 108. This causes the diaphragm to invert relative to the normal position, so that it instead has a convex side facing the member 102 (or the spacer 104), and correspondingly a concave side facing into the cell can.

In the illustrated situation, the pressure has caused at least the groove 110 to rupture, creating at least one gap 206 between the separation portion and the member 102. That is, the separation portion has now been separated from the rest of the member so that there is no electrical contact between the two. This severance of electrical contact serves as a CID operation for the cell. That is, by disconnecting the separation portion from the rest of the member, the flow of current into or out of the cell is interrupted. Meanwhile, the diaphragm 106 remains unbroken at this stage, so as to prevent gas or other fluid inside the cell can from leaking out through the gap 206. That is, the CID operation can perform interruption of current while restricting leakage of fluid.

In certain situations, however, the internal pressure may increase to a point where it causes the diaphragm 106 to rupture. FIG. 2C illustrates that an increased internal pressure 208 has pushed the spacer 104 and the separation portion 108 further outward until the diaphragm 106 breaks. As such, gas or other fluid inside the cell can is allowed to escape the interior by way of the gap 206, which is here larger than during CID operation. This can be considered a venting operation that not only interrupts the flow of current (which may have already occurred during CID operation) but also reduces or eliminates a potentially harmful pressure buildup inside the cell can.

Figure 3A:
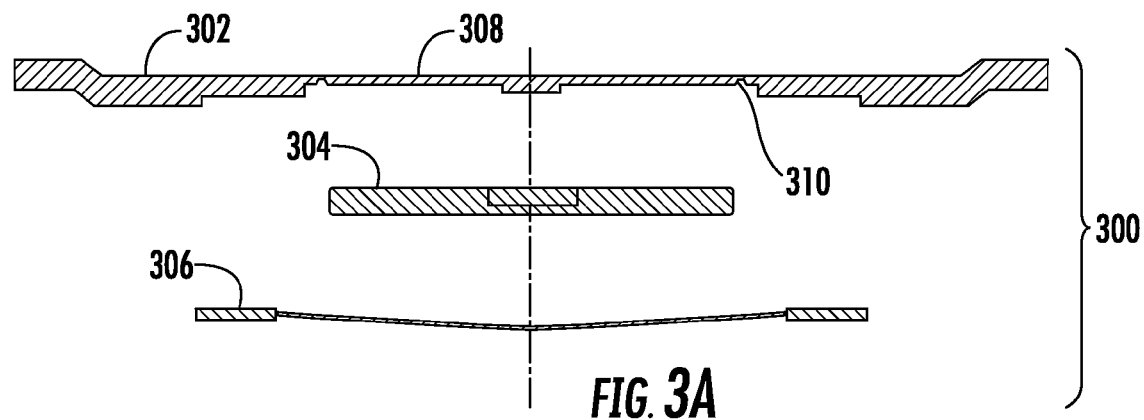
FIGS. 3A-B show another example of a cap for a cell.
Figure 3B:
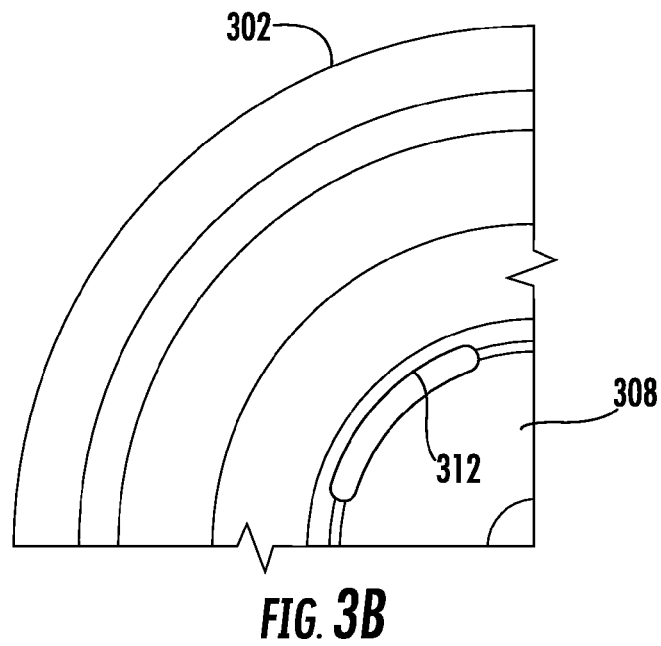

FIGS. 3A-B show another example of a cap 300 for a cell. Aspects or features that are similar to the example above will not be repeated here. The cap includes a member 302, a spacer 304 and a diaphragm 306. A separation portion 308 is defined in the member. In this example, the cap has two types of material weakening: a groove 310 is formed in the material of the member 302 and an opening 312 (FIG. 3B) through the member. The groove and the opening may together form a closed shape of material weakening that defines the separation portion. In some implementations, each of them has an arcuate shape so that consecutively placed grooves and openings form essentially the shape of a circle. For example, grooves and openings can be alternated around the perimeter of the separation portion. As another example, one or more radial grooves (e.g., FIG. 1B) can be formed in the member 302.

Figure 4A:
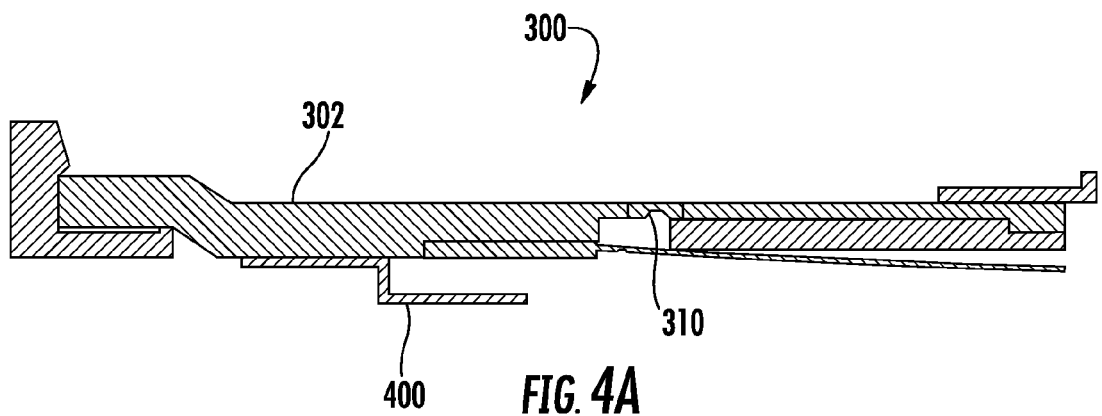
FIGS. 4A-C show examples of normal operation, CID operation, and venting operation, respectively, of the cap in FIGS. 3A-B.
Figure 4B:
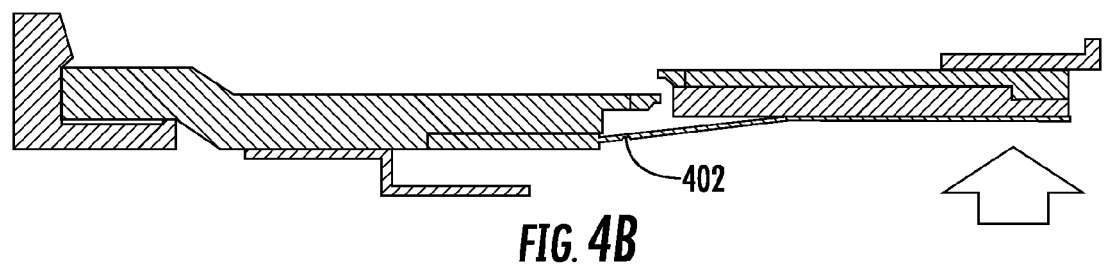
Figure 4C:
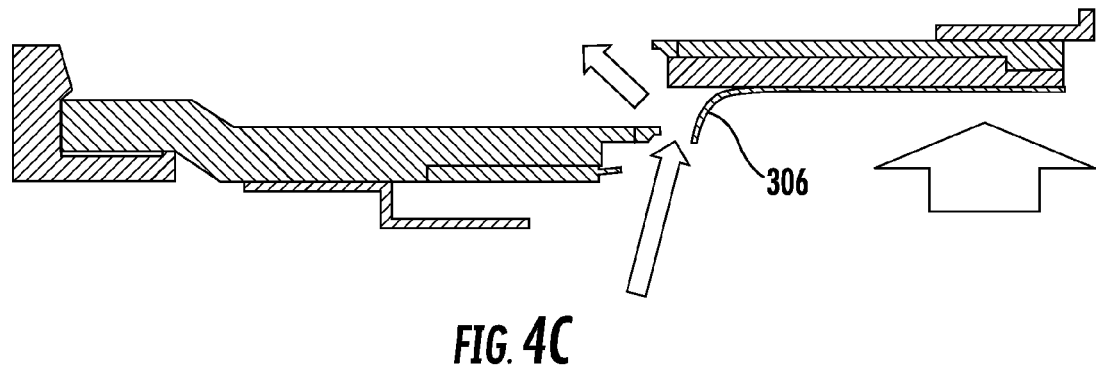

FIGS. 4A-C show examples of normal operation, CID operation, and venting operation, respectively, of the cap in FIGS. 3A-B. Some aspects or features that were discussed with regard to FIGS. 3A-B will not be repeated here. A lead 400 is mounted on the inside of the member 302; that is, on the side facing the interior of the cell can. In some implementations, this serves as a cathode lead that connects the cap 300 to a cathode inside the cell can. Similar to preceding examples, an increased internal pressure eventually causes the groove 310 (and/or other material weakening) to rupture so that CID operation is accomplished, for example as shown in FIG. 4B. If the pressure increases further, the diaphragm 306 may rupture and allow venting operation, for example as shown in FIG. 4C. In some implementations, the diaphragm may have a material weakening to facilitate the rupturing at or around a particular internal pressure. For example, at least one groove 402 (FIG. 4B) can be formed in the diaphragm.

Figure 5:
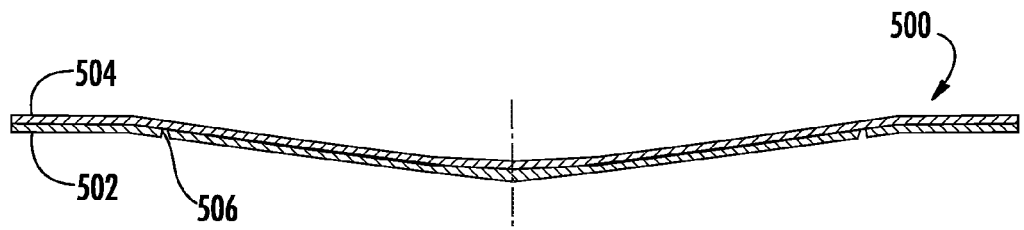
FIG. 5 shows an example of a diaphragm that may be used with a cap for a cell.

FIG. 5 shows an example of a diaphragm 500 that may be used with a cap for a cell. The diaphragm can be used with the cap 100 (FIGS. 1A-B) and/or with the cap 300 (FIGS. 3A-B), to name just two examples. The diaphragm 500 is a laminate of two or more layers. The laminate may include two or more different materials. In some implementations, at least one layer is made from metal and at least one layer is made from a polymer. For example, a lower layer 502 may comprise aluminum film. As another example, an upper layer 504 may comprise a film of a polyolefin material. The diaphragm may have a thicker edge (not shown) similar to the diaphragms in examples above, whereas a central portion 506 of the diaphragm (which may be the part that is laminated) is thinner than the edge.

In some implementations, the diaphragm has a material weakening to facilitate the rupturing at or around a particular internal pressure. For example, at least one groove 606 may be formed in the diaphragm.

Figure 6A:
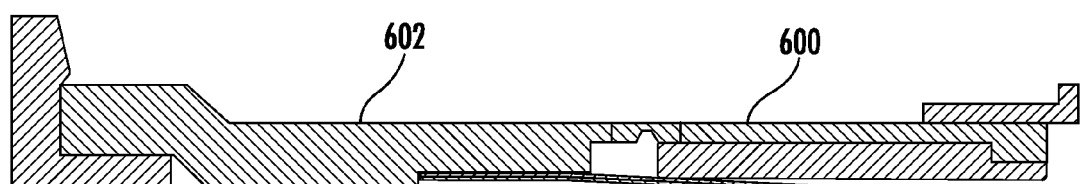
FIGS. 6A-C show examples of normal operation, CID operation, and venting operation, respectively, of a cap having the diaphragm in FIG. 5.
Figure 6B:
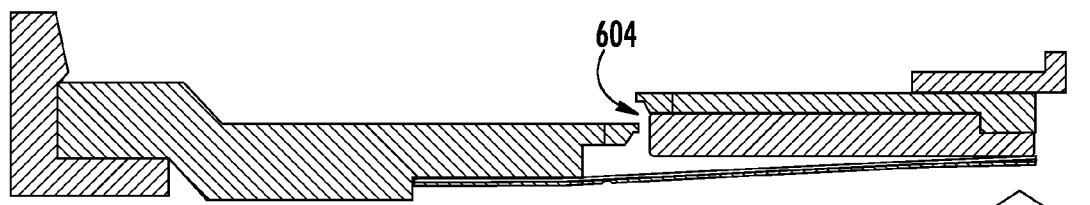
Figure 6C:
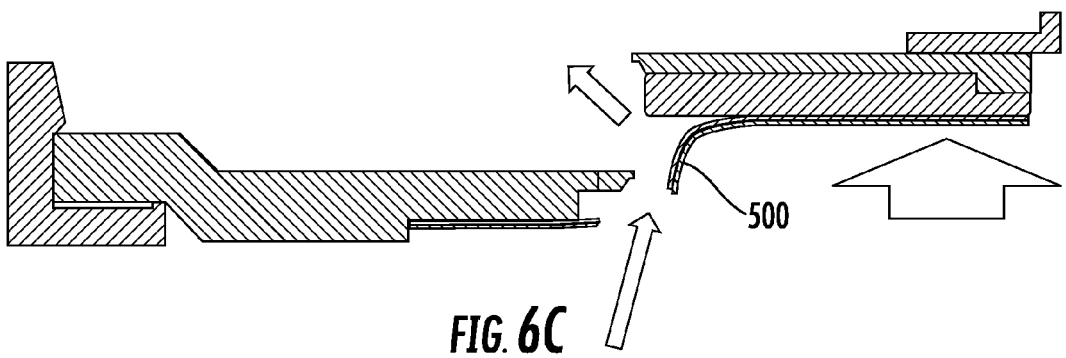

FIGS. 6A-C show examples of normal operation, CID operation, and venting operation, respectively, of a cap having the diaphragm 500 in FIG. 5. That is, during normal operation, a separation portion remains in contact with a remainder of a member 602. In CID operation, a gap 604 is created to interrupt current flow. In a venting operation (FIG. 6C), the diaphragm 500 is ruptured.

FIGS. 7A-B show an example of inversion of a diaphragm 700. The cap here has an opening 702 between a separation portion 704 and a remainder of a member 706. The separation portion is also defined by a groove 708. As such, the member 706 is configured so that it ruptures at or around a certain pressure inside the cell can, which will here be referred to as a rupture pressure of the separation portion. That is, the material that remains after the material weakening has been formed provides certain strength to the connection between the separation portion and the rest of the member, and this material joint will be severed at or around the rupture pressure. As such, the rupture pressure may depend on the size and other characteristics of the weakened material, and also on any force needed to break or deform an electrical connector on the outside of the separation portion.

Moreover, the diaphragm 700 is configured so that it inverts at or around a certain pressure inside the cell can, here referred to as the inversion pressure. For example, the inversion pressure may depend on the type of material in the diaphragm, its size, and/or its shape.

The diaphragm 700 and the member 706 are here configured so that the inversion pressure of the diaphragm is larger than the rupture pressure of the separation portion. In some implementations, such a relationship of the respective pressures may be chosen in an attempt to ensure that by the time the cell can's internal pressure has increased enough to invert the diaphragm, the pressure is sufficient to also cause the separation portion to rupture. Solely as an example, the inversion pressure may be about twice the amount of the rupture pressure. In other implementations, the inversion pressure and the rupture pressure may have another relationship or be equal.

FIGS. 8 and 9 show examples of a cap during or after operation. In FIG. 8, a cap 800 has a separation portion 802 that is initially connected by three bridges 804. For example, the bridges are material that remains in the cap after other material is punched out. Here, all three of the bridges have been severed. As such, this illustrates an example of CID operation, in that the electrical connection has been severed but no fluid leakage (i.e., venting) is currently provided.

In FIG. 9, a cap 900 likewise has a separation portion 902 whose three bridges 904 have been severed, but here the internal pressure reached a point where also a diaphragm 906 ruptured. For example, a piece 908 was effectively punched out from the diaphragm (such as by an underlying spacer). This may allow gas or other fluids (e.g., from a chemical reaction inside the cell) to escape the cell can.

Figure 10:
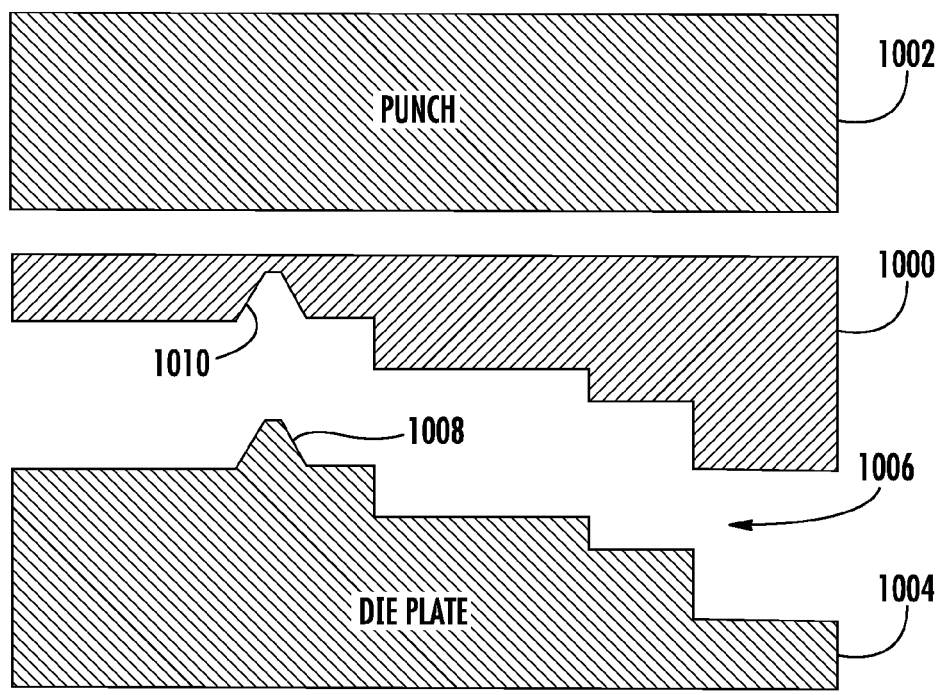
FIGS. 10 and 11 show examples of generating a material weakening in a member for a cell cap.
Figure 11:
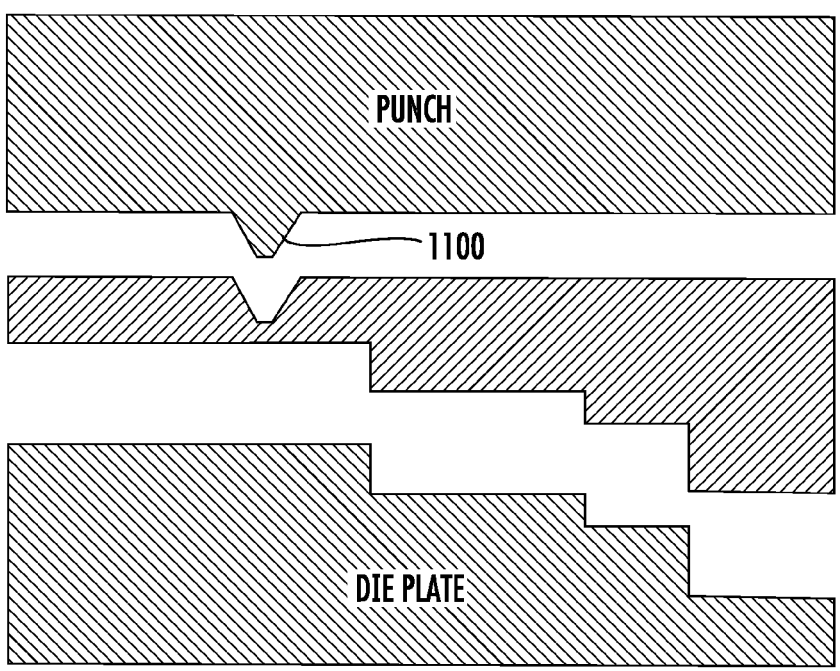

FIGS. 10 and 11 show examples of generating a material weakening in a member for a cell cap. In FIG. 10, a member 1000 (e.g., analogous to the members 102, 302, 602 or 706 above) is being worked on using a punch 1002 and a die plate 1004. For clarity, only a portion of each is shown. The die plate here has multiple features 1006 (e.g., plateaus or other segmentations) intended to form corresponding shapes in the member upon punching. Also, the die plate has an edge 1008 configured for creating a corresponding stamp 1010 (e.g., a groove) in the member. The edge can be fully circular or can consist of one or more circle segments, to name just a few examples. In FIG. 11, by contrast, an edge 1100 is formed on the punch instead. The punch and die plate can be configured so that either of them faces what is to become the outside of the cap, or the inside of the cap.

In some implementations, it may be easier to make a punch with the edge thereon than the die plate. In some implementations, the manufacturing process may be simplified by the latter configuration. For example, the resulting stamp may be created with greater precision.

Figure 12:
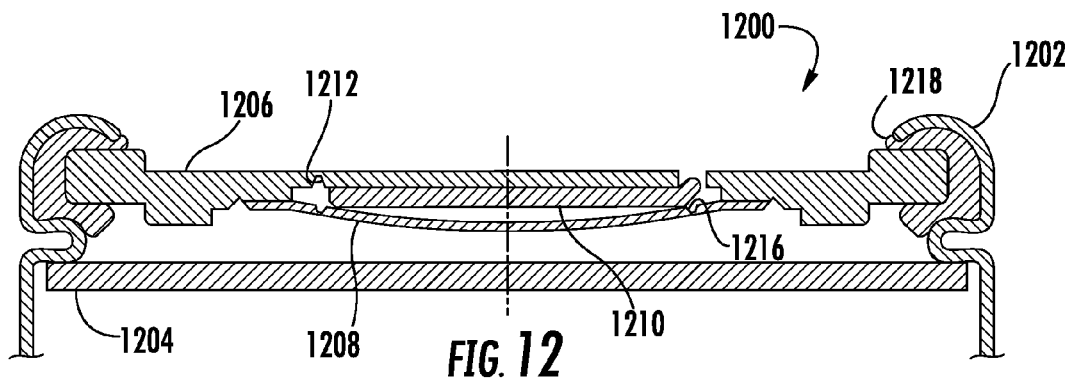
FIGS. 12-14 show other examples of caps for a cell.
Figure 13:
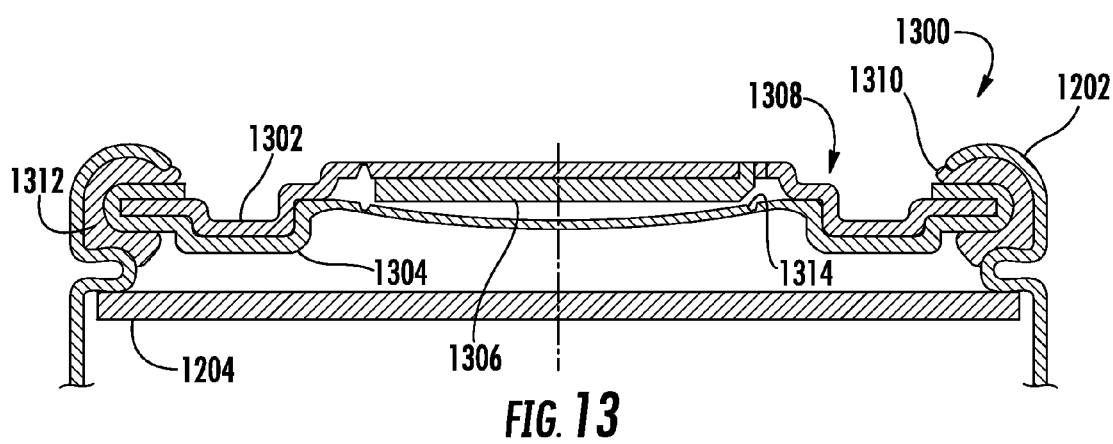
Figure 14:
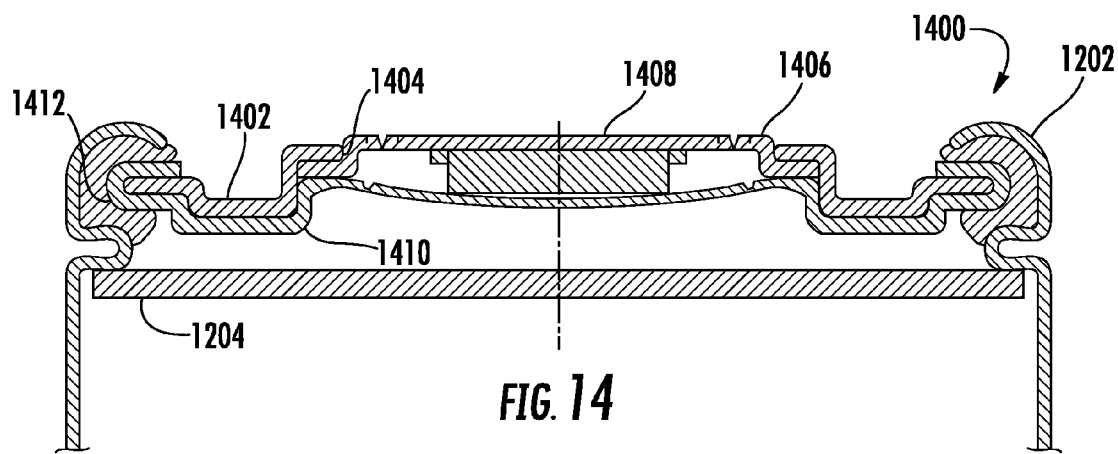

FIGS. 12-14 show other examples of caps 1200, 1300 and 1400 for a cell. Common to these is that they are each implemented together with a respective cell can 1202 that has a separator 1204. The separator is positioned between, on the one hand, the cathode terminal, and on the other hand, the active materials and the electrolyte. Beginning with the cap 1200, it has a member 1206 and a diaphragm 1208 with a spacer 1210 between them. At least one groove 1212 and at least one opening 1214 are formed in the member. The diaphragm has material weakening 1216 therein. The cap is held in place within the opening of the cell can by a gasket 1218. Solely as examples, the member 1206 may be formed from aluminum; the spacer may be formed from plastic; the diaphragm may be formed from aluminum foil; and/or the gasket may be formed from plastic. In some implementations, one or more other materials may be used. Also as an example, the diaphragm may be laser welded to the member.

Turning now to the cap 1300, it has a member 1302 and a diaphragm 1304 with a spacer 1306 between them. The member has a stepped structure 1308 to which the diaphragm corresponds to a certain degree. Here, a gasket 1310 is used for sealing around a crimp 1312 that is formed between the cell can 1202 and the cap 1300. Particularly, the crimp is formed by an outer edge of the diaphragm extending past and around the edge of the member 1302. As such, the diaphragm may initially be wider than the member 1302 so that its edge may be folded around and over the edge of the member. The diaphragm 1304 may be thinner towards its center (e.g., near the spacer 1306). As another example, the diaphragm may have one or more grooves 1314.

In some implementations, the member 1302 and the separation portion thereof may be formed from a single piece of a particular material. Solely as an example, the member 1302 may be made of steel; the spacer 1306 may be made of plastic; the diaphragm 1304 may be made of aluminum foil; and/or the gasket 1310 may be made of plastic.

FIG. 14, finally, shows the cap 1400 comprising a support structure 1402 that has an opening 1404 through it, and a member 1406 that covers the opening. The member 1406 in turn has a separation portion 1408 defined therein, in analogy with other examples herein. A diaphragm 1410 is positioned on the inside of the structure 1402 and the member 1406. A crimp 1412 is formed at the edge of the cap 1400; particularly, the edge of the diaphragm 1410 may be folded around and over the edge of the support structure 1402.

In some implementations, the support structure 1402, the member 1406 and the separation portion 1408 thereof may be formed from the same material. In other implementations, however, two or more different materials can be used. Solely as an example, the support structure 1402 may be made of steel (optionally with a plating, such as nickel); the member 1406 may be made of aluminum; and/or the diaphragm 1410 may be made of aluminum foil. Also as an example, the member 1406 and the support structure 1402 can be welded together, such as by point laser welding.

Figure 15A:
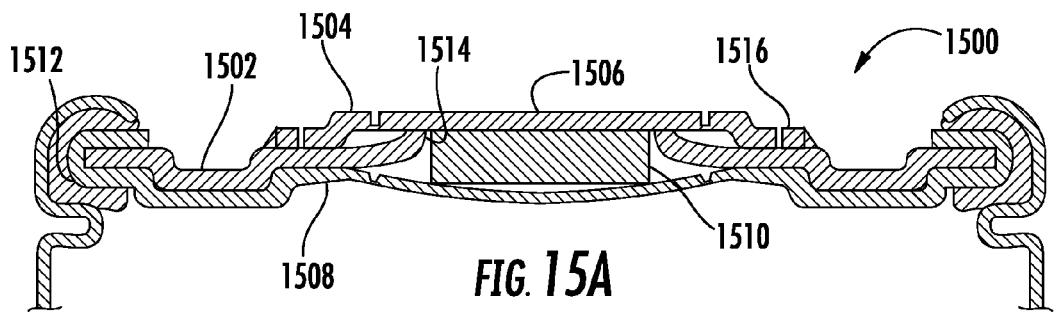
FIGS. 15A-B show examples of normal operation and CID operation, respectively, of another cap for a cell.
Figure 15B:
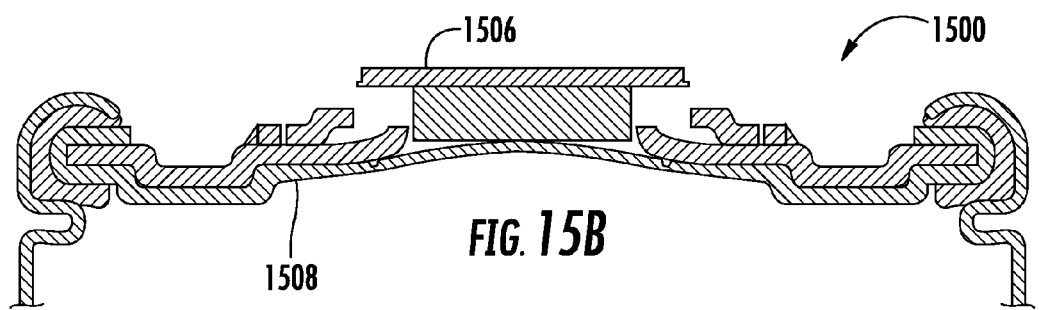

FIGS. 15A-B show examples of normal operation and CID operation, respectively, of another cap 1500 for a cell. The cap 1500 has a support structure 1502 with a member 1504 covering an opening thereof, the member having a separation portion 1506 formed therein. A diaphragm 1508 is positioned on the inside of the support structure and the member 1504, with a spacer 1510 similar to previous examples herein. Also similar to other examples is that the diaphragm 1508 forms a crimp 1512 by wrapping around an edge of the support structure 1502.

Here, however, the support structure 1502 forms an opening at its center. The inner edge 1514 that defines the opening is configured so that the separation portion 1506 rests thereon. For example, this allows the separation portion 1506 to be wider than the opening provided by the support structure 1502.

The member 1504 can be attached to the support structure 1502 using any suitable technique. Solely as an example, one or more beads of adhesive 1516 can be provided around the edge of the member.

FIG. 15B, in turn, show an example of the cell 1500 during or after CID operation. Particularly, the internal pressure of the cell can has inverted the diaphragm 1508 so as to urge the spacer 1510, and thereby the separation portion 1506, in the direction away from the cell interior. This has interrupted the electrical connection through the cap 1500.

Figure 16A:
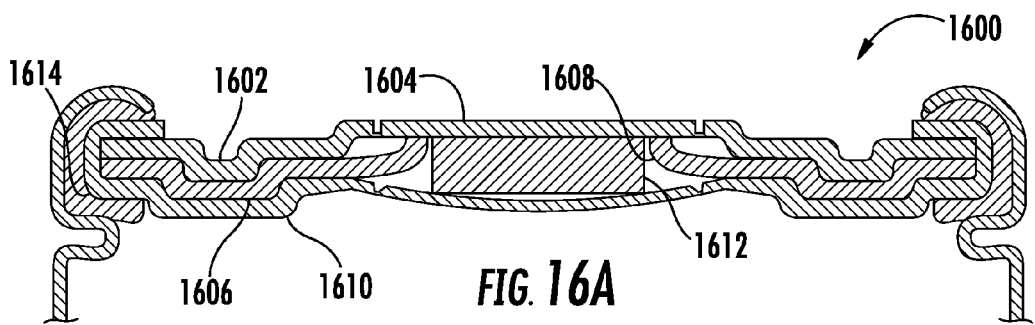
FIGS. 16A-B show examples of normal operation and CID operation, respectively, of yet another cap for a cell.
Figure 16B:
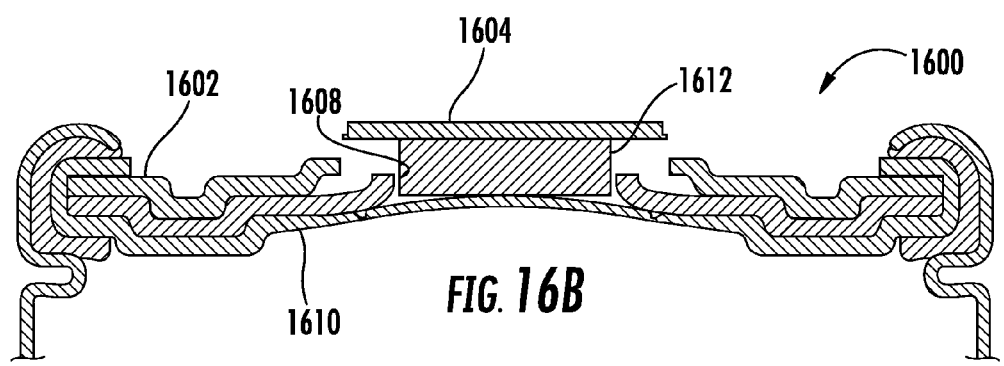

FIGS. 16A-B show examples of normal operation and CID operation, respectively, of yet another cap 1600 for a cell. Particularly, the cap has a member 1602 that forms a separation portion 1604 therein; a support structure 1606 that forms an opening 1608 therein; and a diaphragm 1610 that is separated from the separation portion by a spacer 1612. That is, in this example, the member 1602 and the support structure 1606 may be of approximately the same width. Here, a crimp 1614 is formed by the edge of the diaphragm being folded around the respective edges of the member 1602 and the support structure 1606.

In the CID operation shown in FIG. 16B, the cap 1600 has interrupted the flow of current by having the diaphragm 1610 be inverted and advance the spacer 1610 further through the opening 1608, thereby severing the separation portion 1604 from the rest of the member 1602.

A number of implementations have been described as examples. Nevertheless, other implementations are covered by the following claims.

What is claimed is:

1. An electrochemical cell comprising:
   a cell can having an opening;
   electrolyte and an active-material roll in the cell can; and
   a cap that closes the opening of the cell can, the cap comprising:
   a substantially flat member that covers the opening of the cell can, the substantially flat member having a separation portion defined therein;
   a diaphragm that covers the separation portion on an inside of the substantially flat member, and
   an inner member that forms the diaphragm, the inner member being wider than the substantially flat member, wherein the inner member forms a crimp around at least an edge of the substantially flat member, wherein the diaphragm is thinner than a portion of the inner member that forms the crimp.

2. The electrochemical cell of claim 1, wherein an electrical connector is attached to the separation portion on an outside of the cap.

3. The electrochemical cell of claim 1, further comprising a spacer positioned between the diaphragm and the substantially flat member.

4. The electrochemical cell of claim 1, wherein the separation portion is defined by a material weakening that surrounds the separation portion.

5. The electrochemical cell of claim 4, wherein the material weakening comprises a stamp formed in a material of the substantially flat member.

6. The electrochemical cell of claim 4, wherein the material weakening forms at least a first part of a circle around the separation portion.

7. The electrochemical cell of claim 6, wherein the separation portion is further defined by an opening of the separation portion through the substantially flat member, the diaphragm preventing leakage of the electrolyte through the opening of the separation portion.

8. The electrochemical cell of claim 7, wherein the opening of the separation portion forms at least a second part of the circle.

9. The electrochemical cell of claim 6, wherein the material weakening further comprises a radial stamp formed in a material of the substantially flat member.

10. The electrochemical cell of claim 1, further comprising a weld joint between the diaphragm and the substantially flat member.

11. The electrochemical cell of claim 1, wherein the diaphragm comprises a laminate of different materials.

12. The electrochemical cell of claim 1, wherein the diaphragm has a concave side facing the substantially flat member so that the diaphragm inverts upon presence of at least an inversion pressure, and wherein the diaphragm and the substantially flat member are configured so that the inversion pressure is larger than a rupture pressure of the separation portion.

13. The electrochemical cell of claim 1, wherein the substantially flat member comprises a single piece.

14. The electrochemical cell of claim 1, wherein the diaphragm is thinner than the separation portion.

15. The electrochemical cell of claim 1, wherein the separation portion and a remainder of the substantially flat member are formed from different materials.

16. An electrochemical cell comprising:
a cell can having an opening;
electrolyte and an active-material roll in the cell can; and
a cap comprising:
a substantially flat member being a support structure having an opening through it;
a top plate covering the opening of the substantially flat member; and
an inner member that forms a diaphragm that closes the opening of the cell can on an inside of the substantially flat member, the inner member being wider than the support structure,
wherein the inner member forms a crimp around at least an edge of the support structure.

17. The electrochemical cell of claim 16, wherein the support structure and the top plate are formed from different materials.

18. The electrochemical cell of claim 16, further comprising a spacer positioned in the opening of the substantially flat member and between the top plate and the diaphragm.

19. The electrochemical cell of claim 16, wherein the top plate is as wide as the support structure and wherein the inner member forms the crimp around both the edge of the support structure and an edge of the top plate.

20. The electrochemical cell of claim 16, further comprising a weld joint between the diaphragm and the substantially flat member.

21. The electrochemical cell of claim 16, wherein the diaphragm comprises a laminate of different materials.

22. The electrochemical cell of claim 16, wherein the diaphragm has a concave side facing the substantially flat member so that the diaphragm inverts upon presence of at least an inversion pressure, and wherein the diaphragm and the substantially flat member are configured so that the inversion pressure is larger than a rupture pressure of the separation portion.

23. The electrochemical cell of claim 16, wherein the substantially flat member comprises a single piece.

24. The electrochemical cell of claim 16, wherein the diaphragm is thinner than a portion of the inner member that forms the crimp.

* * * * *